United States Patent [19]

Engelskirchen et al.

[11] 4,013,821
[45] Mar. 22, 1977

[54] PROCESS FOR PREPARATION OF MIXED CELLULOSE ETHERS CONTAINING 2,3-DIHYDROXYPROPYL ETHER GROUPS

[75] Inventors: Konrad Engelskirchen, Lank, Niederrhein; Joachim Galinke, Dusseldorf-Holthausen, both of Germany

[73] Assignee: Henkel & Cie G.m.b.H., Dusseldorf, Germany

[22] Filed: Mar. 17, 1975

[21] Appl. No.: 558,631

[30] Foreign Application Priority Data

Mar. 29, 1974 Germany ............................ 2415154

[52] U.S. Cl. .................................. 536/88; 106/170; 536/90; 536/91
[51] Int. Cl.$^2$ ........................................ C08B 11/193
[58] Field of Search .......... 260/232, 231 A, 231 R; 106/170; 536/88, 90, 91

[56] References Cited

UNITED STATES PATENTS

| | | | |
|---|---|---|---|
| 2,135,128 | 11/1938 | Thomas et al. ................ | 260/232 |
| 2,388,764 | 11/1945 | Reichel et al. ................. | 260/232 |
| 2,687,411 | 8/1954 | Higgins .......................... | 260/232 |
| 2,834,777 | 5/1958 | Jullander ........................ | 260/232 |
| 2,854,447 | 9/1958 | Monson et al. ................. | 260/232 |
| 3,356,519 | 12/1967 | Chambers et al. .............. | 260/232 |
| 3,489,719 | 1/1970 | Savage et al. .................. | 260/232 |
| 3,498,738 | 3/1970 | Tesoro ............................ | 260/232 |
| 3,652,539 | 3/1972 | Miura et al. .................... | 260/232 |
| 3,903,075 | 9/1975 | Schminke et al. .............. | 260/232 |

*Primary Examiner*—Ronald W. Griffin
*Attorney, Agent, or Firm*—Hammond & Littell

[57] ABSTRACT

A process for the manufacture of cellulose ethers is characterized in that cellulose ethers which contain one or several alkyl, hydroxyalkyl, or carboxyalkyl substituents and which have a total degree of substitution (D.S.) of 0.05 to 4.0 are converted into the corresponding 2,3-dihydroxypropyl mixed ethers by reaction with glycidol and/or glycerol monohalohydrin such as 1-halo-2,3-dihydroxypropane and that the reaction products are processed in a manner known per se, as well as a cellulose mixed ether containing 2,3-dihydroxypropyl ether groups produced by the above process; along with an aqueous composition having increased viscosity comprising water containing this cellulose mixed ether plus borate ions.

13 Claims, No Drawings

PROCESS FOR PREPARATION OF MIXED CELLULOSE ETHERS CONTAINING 2,3-DIHYDROXYPROPYL ETHER GROUPS

THE PRIOR ART

Water-soluble cellulose ethers, such as for example, methyl cellulose, hydroxyethyl cellulose, hydroxypropyl cellulose and sodium carboxymethyl cellulose, as well as cellulose mixed ethers that is cellulose ethers having two or more different substituents, for example, methyl hydroxyethyl cellulose, methyl hydroxypropyl cellulose, hydroxyethyl hydroxypropyl cellulose, methyl hydroxybutyl cellulose, ethyl hydroxyethyl cellulose, and hydroxyethyl carboxymethyl cellulose are used in various fields of application as thickeners for aqueous systems, such as paints, adhesives and pastes for numerous different technical and cosmetic purposes. For many fields of application a substantially salt-free condition of the cellulose ethers is necessary. Therefore, when the cellulose ethers are processed, they have to be freed from the salts formed in the etherification, which, in general is accomplished by treatment with hydrophilic solvents. The cellulose ethers are, in general, prepared by reacting alkali celluloses with the respective etherifying agents. In this process, resulting oxidative decomposition leads to a decrease in the degree of polymerization of the cellulose and thus to a decrease in the viscosity of the aqueous cellulose ether solution. In order to prepare cellulose ethers whose aqueous solutions are highly viscous it is necessary either to start with cellulose types having a high degree of polymerization, such as cotton linters, or to take care that oxygen is excluded as much as possible during the manufacturing process. The high-molecular-weight cellulose types are rare or are used for other fields of application. On the other hand, the exclusion of oxygen is an expensive procedure from a chemical engineering viewpoint. Moreover, the maximum viscosities of aqueous cellulose ether solutions attainable in the prior art are very often unsatisfactory.

OBJECTS OF THE INVENTION

It is an object of the present invention to provide a process for preparing new cellulose ethers which can be especially easily washed out in the presence of borate ions, and the solution of which in the presence of borate ions, is distinguished by an especially high viscosity.

It is another object of the present invention to provide a process for preparing cellulose ethers which overcome the above-mentioned drawbacks, and more specifically, to provide a method for preparing cellulose ether solutions having an extremely high viscosity.

It is a further object of the present invention to provide a process for preparing cellulose ethers, characterized in that cellulose ethers which contain one or several alkyl, hydroxyalkyl, or carboxyalkyl substituents and which have a total degree of substitution (D.S.) of 0.05 to 4.0 are converted into the corresponding 2,3-dihydroxypropyl mixed ethers by reaction with glycidol and/or glycerol monohalohydrin such as 1-halo-2,3-dihydroxypropane and that the reaction products are processed in a manner known per se.

These and further objects of the present invention will become apparent as the description thereof proceeds.

DESCRIPTION OF THE INVENTION

The present invention concerns the manufacture of new cellulose ethers which can be especially easily washed out in the presence of borate ions, and the solution of which in the presence of borate ions, is distinguished by an especially high viscosity.

The process according to the invention is for the preparation of cellulose ethers and is characterized in that cellulose ethers which contain one or several alkyl, hydroxyalkyl, or carboxyalkyl and which have a total degree of substitution (D.S.) of 0.05 to 4.0 are converted into the corresponding 2,3-dihydroxypropyl mixed ethers by reaction with glycidol and/or glycerol monohalohydrin such as 1-halo-2,3-dihydroxypropane and that the reaction products are processed in a manner known per se.

More particularly the present invention provides a process for the preparation of cellulose mixed ethers containing 2,3-dihydroxypropyl ether groups comprising reacting a starting cellulose ether having at least one substituent selected from the group consisting of alkyl having 1 to 4 carbon atoms, hydroxyalkyl having 1 to 4 carbon atoms, carboxyalkyl having 2 to 4 carbon atoms, and mixtures thereof, said cellulose ether having a total degree of substitution (D.S.) of 0.05 to 4.0, with an etherifying agent selected from the group consisting of glycidol, glycerol monohalohydrin and mixtures thereof, under etherifying conditions while the reaction mixture is at a pH over 7.5 to produce the corresponding cellulose mixed ether containing 2,3-dihydroxypropyl ether groups and recovering said cellulose mixed ether containing 2,3-dihydroxypropyl ether groups.

In addition the present invention provides a cellulose mixed ether containing 2,3-dihydroxypropyl ether groups produced by the above-mentioned process.

Also the present invention is directed to an aqueous composition having increased viscosity containing 2% by weight, of a mixture consisting essentially of the cellulose mixed ether containing 2,3-dihydroxypropyl ether groups as mentioned above, and an amount of borate ions effective to produce said increased viscosity.

Suitable starting materials for the manufacture of the cellulose mixed ethers of the invention having 2,3-dihydroxypropyl ether groups, are fundamentally all cellulose ethers which contain a sufficient number of hydroxyl groups capable of reaction. These hydroxyl groups can be hydroxyl groups originally present in the anhydroglucose units of the cellulose as well as hydroxyalkyl substituents.

Preferred cellulose ethers or cellulose mixed ethers are those which contain 0.05 to 3.0, especially 0.1 to 2.8 substituents or mixtures of substituents per anhydroglucose unit. Examples of these substituents are alkyl having 1 to 4 carbon atoms, such as methyl, ethyl, propyl or butyl, hydroxyalkyl having 1 to 4 carbon atoms, such a hydroxyethyl, hydroxypropyl or hydroxybutyl, as well as carboxyalkyl having 2 to 4 carbon atoms, such as carboxymethyl.

According to a preferred embodiment for carrying out the process of the invention which gives favorable results under practical circumstances, hydroxyethyl cellulose or hydroxypropyl cellulose is used as the starting material.

When using such hydroxyalkyl ethers, the compounds may contain hydroxyalkyloxyalkyl ethers and the amount of substitution is given as the degree of molar substitution (M.S.).

The reaction of the cellulose ethers with glycidol, or with glycerol monohalohydrins such as 1-halo-2,3-dihydroxypropane wherein halo is chloro or bromo is carried out in a known manner. Suitable agents for the introduction of the 2,3-dihydroxypropyl groups are in addition to glycerol monohalohydrins for example, 1-chloro-2,3-dihydroxypropane, especially glycidol and its easily saponifiable derivatives, such as the lower alkanoic acid esters of glycidol for example, glycidol acetate, which substantially reacts like glycidol under the reaction conditions of etherification. The use of glycidol and its derivatives is preferred, since the 1-halo-2,3-dihydroxypropanes in general, contain dihalo compounds which are not or are only very difficultly separable, and which present even in small amounts, result in cross-linking reactions of the cellulose. Thus they have a disadvantageous effect on the solubility properties of the cellulose derivatives.

For carrying out the etherification of the cellulose ethers with glycidol, or its derivatives, or with glycerol monohalohydrins it is advantageous to allow these reagents to react at room temperature or slightly elevated temperatures in the presence of substances having a basic effect, and optionally if necessary, in the presence of a substantially inert organic solvent. In etherification of cellulose it is necessary to maintain the reaction medium at a pH of 7.5 or over during etherification.

In a preferred embodiment for carrying out the invention, the cellulose ether is suspended in an organic solvent, and after the addition of the aqueous solution of a substance having an alkaline reaction, is reacted with the 2,3-dihydroxypropylating agents at temperatures of 40° C to 80° C.

Solvents suitable as suspending agents are, for example, water-miscible secondary and tertiary alcohols and ketones, such as secondary and tertiary alkanols of 3 to 6 carbon atoms for example isopropanol, isobutanol and tert.butanol, or secondary and tertiary alkanones of 3 to 6 carbon atoms for example acetone or methyl ethyl ketone; and further examples of suitable solvents include ethers for example, cyclic oxaalkanes and dioxaalkanes having 3 to 5 carbon atoms such as dioxane or tetrahydrofuran. Less suitable are primary alcohols, primary lower alkanols for example methanol or ethanol, since they easily react with the etherifying agents. The above-named solvents can be used individually or also as mixtures, and moreover, they can be used in combination with water-immiscible solvents, particularly aliphatic and aromatic hydrocarbons having 5 to 8 carbon atoms such as hexane, benzene or toluene.

Suitable substances which are sufficiently alkaline to maintain the pH of the reaction mixture above 7.5 are the alkali metal hydroxides and alkaline earth metal hydroxides such as sodium hydroxide or potassium hydroxide, and especially sodium hydroxide. When glycerol monohalohydrins are used, it is necessary to utilize amounts of these hydroxides which are equivalent to those of the etherifying agents in order to keep the reaction mixture basic. When the etherification of the cellulose ethers is conducted with glycidol, then equivalent amounts of the hydroxides are not required, since the latter only have a catalytic function in that case. This etherifying reaction is usually carried out when the ratio by weight of cellulose to sodium hydroxide ranges from 1 : 0:01 to 0.8, especially from 1 : 0.05 to 0.5.

When glycidol is reacted with cellulose ethers, for example, with hydroxyethyl cellulose, catalysts for the addition reaction which can also be used are the quaternary ammonium bases, such as hydroxyethyltrimethylammonium hydroxide (choline) or benzyltrimethylammonium hydroxide.

The alkali metal hydroxides, alkaline earth metal hydroxides, and quaternary ammonium hydroxides are used in the form of aqueous solutions. The ratio by weight of cellulose ether to water in the reaction mixture ranges from about 1 :0.1 to 4, preferably from 1 : 0.5 to 2.

After the reaction has been completed, the reaction mixtures may be neutralized; the newly prepared cellulose mixed ethers are isolated, purified by washing with water-containing organic solvents, and then are dried. The neutralization can be carried out by the addition of a mineral acid or an organic acid or their mixtures.

When the etherifying reaction is conducted in the presence of quaternary ammonium hydroxides as catalysts, the neutralization of the reaction mixtures can be omitted. These quaternary ammonium hydroxides can be easily washed out with anhydrous organic solvents, for example, with alcohols in which they are readily soluble.

The purified products are dried, if desired, after the preceding step of dewatering with anhydrous organic solvents. It was unexpectedly found that products having a viscosity of 100,000 cP and higher as 2% aqueous solutions are obtainable when compounds supplying borate ions are added to aqueous solutions of the mixed ethers prepared as described above. Their viscosity can increase to such a considerable extent that highly viscous gels are obtainable.

Compounds supplying borate ions which can be used are metaborates, tetraborates, and peroxyborates in the form of their alkali metal salts, such as sodium or potassium, alkaline earth metal salts, and ammonium salts, especially in form of borax ($Na_2B_4O_7 \cdot 10 H_2O$). Suitable also are easily saponifiable organoboron compounds, such as the boric acid esters, for example, lower alkyl esters of boric acid such as the trimethyl ester of boric acid. The borate ion concentration of the solutions is produced by adding an amount of borate ions effective to produce the desired increased solution viscosity. This produces a practically arbitrary variation of the solution viscosity up to the maximum attainable viscosity which depends upon the number of 2,3-dihydroxypropyl groups contained in the molecule of the cellulose derivatives. Customarily from 0.01 to about 0,5 gram of borate ions are employed for each gram of the cellulose mixed ether containing 2,3-dihydroxypropyl groups. The degree of 2,3-dihydroxypropylation of the cellulose mixed ethers, i.e., the number of 2,3-dihydroxypropyl groups per anhydroglucose unit depends upon the thickening effect one wishes to attain. It has proven to be preferable to add compounds supplying borate ions during the preparation of the cellulose mixed ethers containing 2,3-dihydroxypropyl groups. In the first case when the etherification is with glycidol, this can be accomplished when the alkali used as catalyst is neutralized with boric acid or with boric acid derivatives, for example, the trimethyl borate. In the second case, when glycerol monohalohydrins are employed as the etherifying agents, alkali metal salts of boric acid such as the sodium or potassium salt can be added to the reaction mixtures before or after the etherification.

In the first case, the washing-out of the cellulose mixed ethers with water-containing solvents is unnecessary since the borates being formed during the neutralization of the alkali metal hydroxides can remain in the product.

In the second case, the washing-out of the alkali metal salts formed during the etherification reaction is facilitated since the cellulose derivatives containing 2,3-dihydroxypropyl groups swell only very little in water-containing organic solvents in the presence of borate ions.

The following examples are merely illustrative of the present invention without being deemed limitative in any manner thereof.

The viscosity values reported in the following examples were measured with a Brookfield viscosimeter, model RVT, at 20 rpm and 20° C.

EXAMPLES 1a, 1b, 1c and 1d

In each example, a three-neck round flask was used for suspending 25 gm of an air-dried hydroxyethyl cellulose in 300 gm of acetone, the hydroxyethyl cellulose having a degree of molar substitution (MS) of about 2.5 and a viscosity of about 10,000 cP in an aqueous 2% solution. To each vigorously stirred suspension, a solution of 2 gm of hydroxyethyltrimethylammonium hydroxide in 26 gm of water was added within 10 minutes. After the addition of (a) 3.7 gm, (b) 7.4 gm, (c) 14.8 gm, and (d) 22.2 gm of glycidol, the reaction mixtures were stirred for three hours under reflux conditions. After the cellulose derivatives had cooled, they were filtered off and washed with methanol until the wash liquid showed a neutral reaction. Next, they were dried in a vacuum drying oven at 70° C. The yield of cellulose mixed ethers obtained amounted to (a) 25.8 gm, (b) 27.8 gm, (c) 29.2 gm, and (d) 33.8 gm respectively.

The viscosity of aqueous 2% solutions of these products was reported in Table I, column 2. After the viscosity had been measured, 0.8 gm of sodium tetraborate decahydrate (borax) was added to 200 gm of each solution, and stirring was continued until the salt was dissolved. The viscosity measured after these solutions were allowed to stand overnight is listed in column 3 of Table I.

Table I

| Example No. | Viscosity of an Aqueous 2% Solution without cP. Borax Addition | with cP. |
|---|---|---|
| 1a | 8,200 | 33,000 |
| 1b | 7,500 | 60,000 |
| 1c | 6,150 | 130,000 |
| 1d | 4,350 | 112,000 |

The results shown in Table I are that without the addition of borax, the viscosity of the solution of the cellulose derivative decreases with increasing amounts of 2,3-dihydroxypropyl ether substitution on the cellulose ether. However with the addition of borax, the viscosity of the solution of the cellulose derivative generally increases with increasing amounts of 2,3-dihydroxypropyl ether substitution on the cellulose ether as specifically shown in Examples 1a to 1c.

EXAMPLE 2

125 gms of an air-dried hydroxyethyl cellulose having a degree of molar substitution (MS) of about 2.5 and a viscosity of about 10,000 cP. in an aqueous 2% solution were suspended in 1.5 kg of acetone. To the vigorously stirred suspension, a solution of 10 gm of hydroxyethyltrimethylammonium hydroxide in 130 gm of water was added within 15 minutes. After the addition of 74 gm of glycidol, stirring and refluxing were continued for three hours. After the cellulose mixed ether had been cooled to room temperature, it was filtered off and washed with a mixture consisting of four parts by volume of methanol and six parts by volume of acetone, until the washing liquid reacted neutral. After subsequent drying in a vacuum drying oven at 70° C, 150 gm of a product was obtained, and the aqueous 2% solution thereof had a viscosity of 4,500 cP. (a) 0.1 gm, (b) 0.2 gm, (c) 0.4 gm, (d) 0.6 gm, (e) 0.8 gm (f) 1.0 gm (g) 1.2 gm, and (h) 1.6 gm of sodium tetraborate decahydrate, respectively were added to 200 gm of an aqueous 2% solution of this product. The viscosities of these borax-containing solutions, which were measured after the solutions had been left standing overnight, were reported in Table II.

TABLE II

| Viscosity of an Aqueous 2% Solution of the Cellulose Mixed Ether of Ex. 2 without and with the Addition of Different Amounts of Borax | |
|---|---|
| gm of Borax / 200 gm of Solution | Viscosity in cP |
| 0 | 4,500 |
| 0.1 | 15,200 |
| 0.2 | 30,000 |
| 0.4 | 60,000 |
| 0.6 | 83,500 |
| 0.8 | 97,500 |
| 1.0 | 102,000 |
| 1.2 | 134,000 |
| 1.6 | 146,000 |

An aqueous 2% solution of the cellulose mixed ethers which contained 0.6 gm of sodium peroxyborate per 200 gm of solution, instead of borax, had a viscosity of about 80,000 cP.

EXAMPLE 3

25 gm of an air-dried hydroxyethyl cellulose which had a degree of molar substitution (MS) of about 2.5 and a viscosity of about 10,000 cP. in an aqueous 2% solution was suspended in 300 gm of acetone. A solution of 2 gm of sodium hydroxide in 25 gm of water was added within 15 minutes to the vigorously stirred suspension. After the addition of 14.8 gm of glycidol, the solution was stirred for three hours while being refluxed. After the solution had cooled to room temperature, 1.1 gm of boric acid dissolved in 25 gm of water was added dropwise to this solution, which was stirred vigorously. Subsequently, the cellulose derivative was filtered off and washed four times with methanol, each time with 100 ml of methanol. After drying in a vacuum drying oven at 70° C, 35 gm of a product was obtained, which was easily dispersible in water. An aqueous 2% solution of this product had a viscosity of 83,500 cP.

EXAMPLE 4

25 gm of an air-dried hydroxypropyl cellulose having a degree of molar substitution (MS) of 1.5 was suspended in 300 gm of acetone. A solution of 2 gm of sodium hydroxide in 24 gm of water was added within 15 minutes to this suspension which was stirred vigorously. After the addition of 14.8 gm of glycidol, the reaction mixture was stirred and refluxed for three hours. After the reaction mixture had cooled to room temperature, it was neutralized with a mixture of acetic acid and concentrated hydrochloric acid being used in a weight ratio of 9 : 1.

The cellulose mixed ether was filtered off, washed free of salt with an aqueous 80% solution of acetone and dried at 70° C in a vacuum drying oven.

Thus, 29.3 gm of a product was obtained; and the aqueous 4% solution thereof had a viscosity of 1,000 cP. 25 ml of an aqueous 4% borax solution was added to 200 gm of this aqueous solution. After standing overnight, the resulting solution had a viscosity of 103,500 cP.

EXAMPLE 5

The procedure according to Example 4 was utilized, except that in place of the hydroxypropyl cellulose, 20 gm of a methyl cellulose having a degree of methylation amounting to 1.2 was used. After drying, 22.9 gm of a cellulose mixed ether was obtained, and the aqueous 4% solution thereof had a viscosity of 2,250 cP. After the addition of 1.2 gm of borax to 200 gm of this solution, the viscosity increased to 90,000 cP.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the preparation of cellulose mixed ethers containing 2,3-dihyroxypropyl ether groups comprising suspending a starting cellulose ether having at least one substituent selected from the group consisting of alkyl having 1 to 4 carbon atoms, hydroxyalkyl having 1 to 4 carbon atoms, carboxyalkyl having 2 to 4 carbon atoms and mixtures thereof in an aqueous inert organic solution, said cellulose ether having a total degree of substitution (D.S.) of 0.05 to 4.0, reacting said ether with an etherifying agent selected from the group consisting of glycidol, glycerol monohalohydrin and mixtures thereof under etherifying conditions and at a pH above 7.5 to produce the corresponding cellulose mixed ethers, adding to said suspension a sufficient quantity of a compound supplying borate ions to provide a suspended cellulose mixed ether product which has an increased viscosity in aqueous solution, and recovering said suspended mixed ether product; the amount of said compound supplying borate ions being in the range of 0.01 to 0.5 part by 1 part by weight of said ethers.

2. The process of claim 1, wherein said etherifying agent is glycidol.

3. The process of claim 1, wherein said starting cellulose ether has a total degree of substitution of 0.05 to 3.0.

4. The process of claim 3, wherein said starting cellulose ether has a total degree of substitution of 0.1 to 2.8.

5. The process of claim 1, wherein said starting cellulose ether is selected from the group consisting of hydroxyethyl cellulose and hydroxypropyl cellulose.

6. A progress according to claim 1, wherein the aqueous inert organic solution is aqueous acetone.

7. A process according to claim 1 wherein said solution contains sodium hydroxide.

8. A process according to claim 1 wherein said compound supplying borate ions is introduced into said solution during said etherification.

9. A process according to claim 1 wherein prior to the addition of said compound supplying borate ions said suspension contains alkali and said compound supplying borate ions is borax.

10. A process according to claim 9 wherein said compound supplying borate ions is sodium borate.

11. A process according to claim 1 wherein said compound supplying borate ions is boric acid.

12. A cellulose mixed ether containing borate ions produced by the process of claim 1.

13. An aqueous solution of the borate-containing cellulose mixed ethers of claim 12.

* * * * *